United States Patent
Zilber

(10) Patent No.: US 8,506,107 B2
(45) Date of Patent: Aug. 13, 2013

(54) MOVEMENT-BASED FEEDBACK DEVICE

(75) Inventor: David Zilber, Matthews, NC (US)

(73) Assignee: Med et al, Inc., Matthews, NC (US)

( * ) Notice: Subject to any disclaimer, the term of this patent is extended or adjusted under 35 U.S.C. 154(b) by 130 days.

(21) Appl. No.: 13/309,978

(22) Filed: Dec. 2, 2011

(65) Prior Publication Data

US 2012/0139449 A1  Jun. 7, 2012

Related U.S. Application Data

(60) Provisional application No. 61/419,628, filed on Dec. 3, 2010.

(51) Int. Cl.
*F21V 21/08* (2006.01)
*H05B 37/02* (2006.01)

(52) U.S. Cl.
USPC ............ 362/103; 362/106; 315/307; 315/291

(58) Field of Classification Search
USPC ......... 315/291, 307; 362/103, 106, 184–185, 362/191, 205, 554, 570, 800
See application file for complete search history.

(56) References Cited

U.S. PATENT DOCUMENTS 7,597,449 B2    10/2009  Stokes

OTHER PUBLICATIONS http://orbitlightshow.com/light-show-pm-54.html, Nov. 28, 2011, 3 pgs.

*Primary Examiner* — Vibol Tan
(74) *Attorney, Agent, or Firm* — Smith Moore Leatherwood LLP

(57) ABSTRACT

An apparatus is provided that includes a substrate and an affixed accelerometer configured to measure acceleration of the substrate, and produce a signal representative of the measured acceleration. The apparatus also includes a light-emitting component capable of emitting multiple colors of light with variable luminosity, with the color and luminosity of light emitted by the light-emitting component defining a visual output produced by the light-emitting component. And the apparatus includes a processor coupled to the accelerometer and light-emitting component. The processor is configured to receive the signal from the accelerometer, calculate a visual output according to an algorithm as a function of the measured acceleration of the substrate, and cause the light-emitting component to produce the calculated visual output.

23 Claims, 3 Drawing Sheets

MOVEMENT-BASED FEEDBACK DEVICE

CROSS-REFERENCE TO RELATED APPLICATION(S)

The present application claims priority from U.S. Provisional Patent Application No. 61/419,628, entitled: Movement-Based Feedback Device, filed on Dec. 3, 2010, the content of which is incorporated herein by reference in its entirety.

TECHNICAL FIELD

The present invention generally relates to the application of light to achieve a desired effect, and more particularly, to a personal lighting device for enabling a form of visual expression.

BACKGROUND

Light has long been applied to achieve a desired effect, whether to enhance visibility, project a message or entertain. For example, artificial light may be applied to a roadway to increase its visibility at night. Similarly, for example, artificial light may be applied to an outdoor sign or other advertisement to increase its visibility, as well as to project a message. In yet another example, artificial light may be applied to a surface to merely entertain, such as in the context of a laser light show. Many examples project light in a single color in a fixed direction and with a fixed brightness. Other examples, however, project multiple colors of light in a variable direction and/or with a variable brightness.

A number of music concerts, theatrical performances, dance clubs, parties and other similar events and establishments today employ some form of laser light show. In many of these instances, multiple colors of light may be projected set to music in which the colors, their direction and/or brightness vary as a function of the music being played. Whereas the traditional laser light show may permit the performer, venue or other organizer to provide an added measure of entertainment, those in attendance often also desire to participate in the show. Concertgoers have for years used lighters as a form of visual expression during certain songs played by musicians. And more recently, attendees of concerts, dance clubs, parties or the like have used glow sticks and other similar light sources as a form of visual expression.

Whereas certain light sources have been utilized to provide personal forms of visual expression, and other personal lighting devices have been developed, it is generally desirable to improve upon existing techniques.

SUMMARY

In light of the foregoing background, example embodiments of the present invention provide an improved personal lighting device whose visual output is produced by light-emitting components (e.g., LEDs), including both the color and luminosity of light emitted by the respective components, and may be controlled by a user's movements. Example embodiments may also provide an improved computing device for programming pluralities of personal lighting devices, which may thereby permit a performer, venue or organizer to incorporate the devices of those in attendance to produce an alternative to a traditional laser light show.

According to one aspect of example embodiments of the present invention, an apparatus is provided that includes a substrate such as in a user-wearable form or handheld wand. The apparatus also includes an accelerometer affixed to the substrate, with the accelerometer being configured to measure acceleration of the substrate, and produce a signal representative of the measured acceleration.

The apparatus further includes a light-emitting component capable of emitting multiple colors of light with variable luminosity, with the color and luminosity of light emitted by the light-emitting component defining a visual output produced by the light-emitting component. And the apparatus includes a processor coupled to the accelerometer and light-emitting component. The processor is configured to receive the signal from the accelerometer, calculate a visual output according to an algorithm as a function of the measured acceleration of the substrate, and cause the light-emitting component to produce the calculated visual output. In this regard, according to the algorithm, the luminosity of the light emitted by the light-emitting component may be proportional to a magnitude of the measured acceleration of the substrate.

In one example, according to the algorithm, the luminosity of light emitted by the light-emitting component may decay at a rate directly proportional to a rate at which the magnitude of the acceleration measured by the accelerometer changes.

In one example, the measured acceleration of the substrate may include the magnitude and a direction. In this example, according to the algorithm, the color of the light emitted by the light-emitting component may be calculated based on the direction of the measured acceleration. And in a further example, according to the algorithm, the light-emitting component may emit a first color in an instance in which the measured acceleration is in a first direction, and emit a second, different color in an instance in which the measured acceleration is in a second, different (e.g., opposite) direction.

In one example, the accelerometer may be a multi-axis accelerometer configured to measure component accelerations for respective axes, with the component accelerations having respective magnitudes and directions along the respective axes. In this example, the signal produced by the accelerometer may be representative of the component accelerations. Also in this example, according to the algorithm, the light-emitting component may emit a different color for each component acceleration, with the color for each component acceleration being emitted with a luminosity proportional to the magnitude of the respective component acceleration.

In one example, the processor may be further configured to receive selection of the algorithm from a plurality of different algorithms.

In one example, the apparatus may include a wireless communication interface configured to receive one or more instructions that affect the algorithm according to which the processor is configured to calculate the visual output. In this example, the processor may be configured to follow the one or more instructions as the visual output is calculated according to the algorithm.

In one example, the accelerometer, light-emitting component and processor form a device affixed to the substrate, with the apparatus comprising a plurality of devices each of which includes a respective accelerometer, light-emitting component and processor. In this example, one of the devices may be configured to transmit and others of the devices may be configured to receive, one or more instructions that affect the algorithm according to which the processors of the devices are configured to calculate respective visual outputs. Also in this example, the processors may be configured to follow the one or more instructions as the respective visual outputs are calculated according to the algorithm.

According to another aspect of example embodiments of the present invention, an apparatus is provided that includes a wireless communication interface, and a processor and memory storing computer-readable instructions that, in response to execution by the processor, cause the apparatus to at least perform a number of operations. The apparatus of this aspect may be caused to receive an indication of one or more instructions, and cause transmission of the one or more instructions to a plurality of handheld or user-wearable apparatuses via the wireless communication interface. In this regard, each of the handheld or user-wearable apparatuses may be similar to that described above including an accelerometer affixed to a substrate, a light-emitting component, and a processor coupled to the accelerometer and light-emitting component.

In one example, the handheld or user-wearable apparatuses have respective identifiers. In this example, the processor of the apparatus may be configured to address the instructions to selective ones but not all of the handheld or user-wearable apparatuses according to the respective identifiers.

In one example, the one or more instructions include selection of the algorithm according to which the processors of the handheld or user-wearable apparatuses are configured to calculate the visual output. In this example, the algorithm may be selectable from a plurality of different algorithms.

BRIEF DESCRIPTION OF THE DRAWINGS

Figure 1A:
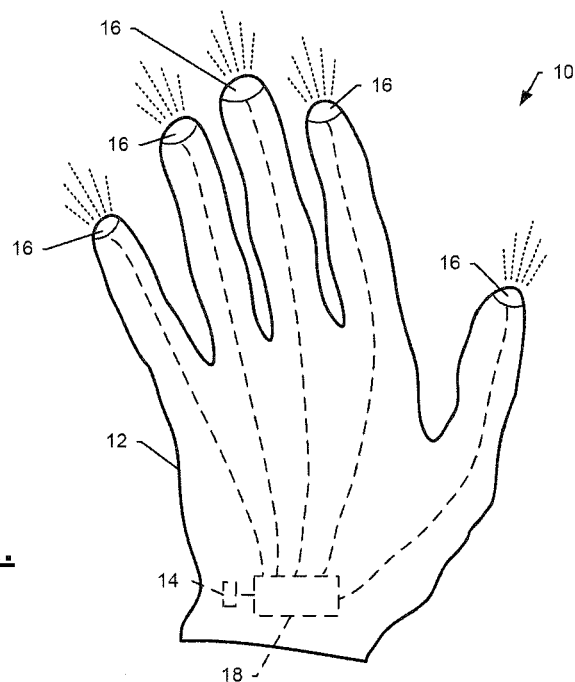
Figure 1B:
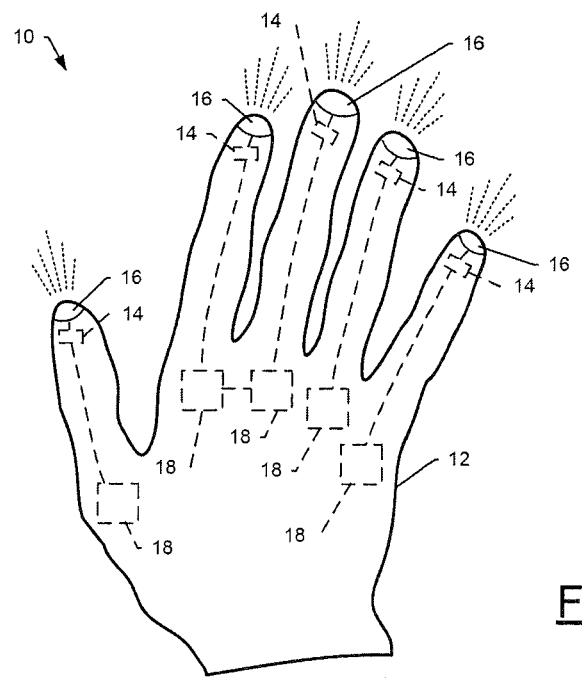
Figure 2:
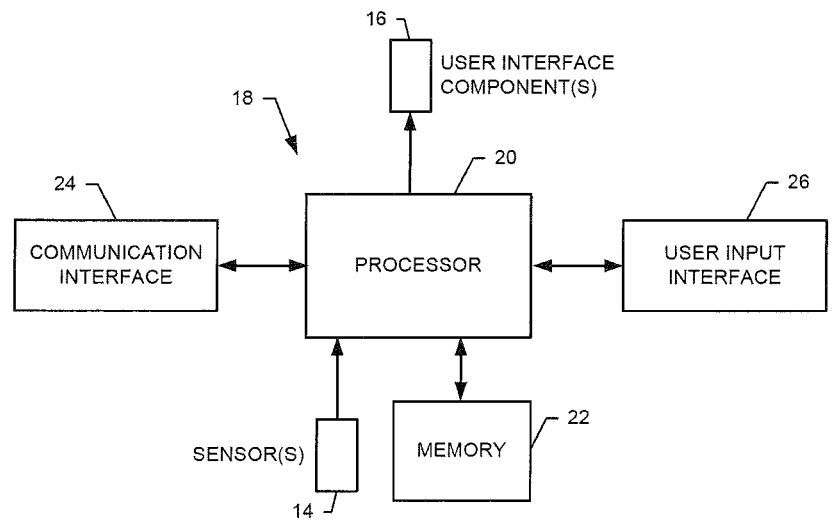
Figure 4:
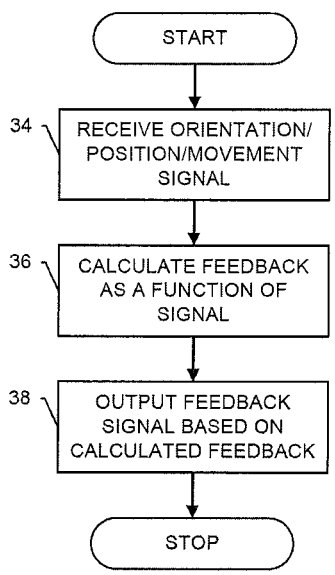
Figure 3:
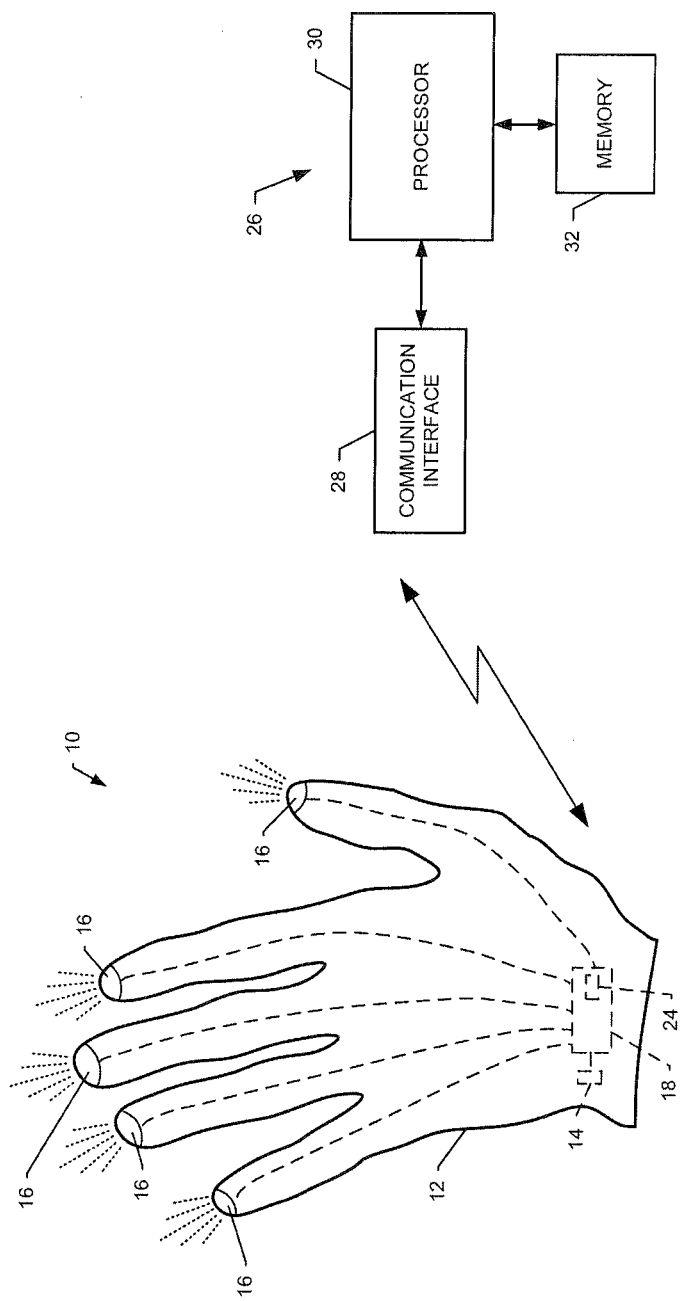

Having thus described the invention in general terms, reference will now be made to the accompanying drawings, which are not necessarily drawn to scale, and wherein:

FIG. 1 (including FIGS. 1a, 1b) and FIG. 2 schematically illustrate an apparatus of one or more movement-based feedback devices affixed to a substrate, according to one example embodiment of the present invention;

FIG. 3 schematically illustrates programming the apparatus of FIGS. 1 and 2, according to one example embodiment of the present invention; and FIG. 4 illustrates various steps in a method of operation of the apparatus according to example embodiments of the present invention.

DETAILED DESCRIPTION

Example embodiments of the present invention relate to a movement-based feedback device, which will be described below more fully hereinafter with reference to the accompanying drawings, in which preferred embodiments of the invention are shown. This invention may, however, be embodied in many different forms and should not be construed as limited to the example embodiments set forth herein; rather, these example embodiments are provided so that this disclosure will be thorough and complete, and will fully convey the scope of the invention to those skilled in the art. Like numbers refer to like elements throughout.

FIG. 1 (including FIGS. 1a, 1b) and FIG. 2 schematically illustrate an apparatus 10 of one or more movement-based feedback devices affixed to a substrate, according to one example embodiment of the present invention. The substrate may have any of a number of different form factors (size, shape, etc.) and, in one particular example embodiment, may be handheld or wearable by a user. As shown, for example, the substrate may be in the form of a user-wearable glove 12, although the substrate may take a number of other forms such as a headband, armband, wristband, belt or the like. In another example embodiment, the substrate may be molded in the form of a thimble or other object configured to fit over a user's finger or fingertip. In yet another example, the substrate may be in the form of a wand sized and shaped for being handheld.

The devices may be configured to measure movement of the user or one or more appendages of the user, and provide feedback such as visual and/or aural feedback based on the measured movement.

Each device may include various means for performing one or more functions in accordance with example embodiments of the present invention, including without limitation those more particularly shown and described herein. As shown, for example, each device may include one or more wired or wireless sensors 14, which may be coupled to one or more user interface components 16 and associated circuitry 18. The sensors may include any of a number of different components configured to detect, sense or otherwise measure an orientation, position and/or movement of the device—or more particularly the user or appendage of the user wearing the device. In one example, the sensors may include single or multi-axis accelerometers or the like. These accelerometers may include, for example, those that output a data signal via the I2C protocol, or simply, analog voltages that correspond to acceleration in each plane (along each axis). Both may employ a series of external hardware or internal software filters, which may modify the signal to accomplish a desired effect, such as eliminating output when the sensor is stationary, eliminating noise or the like.

The user interface components 16 may include any of a number of light or sound-producing components configured to provide visual and/or aural feedback to a user. The user interface may include, for example, one or more single or multicolored light-emitting diodes (LEDs), speakers, displays or other light or sound-producing components that may produce an output with single or multiple intensities, luminosities or the like (e.g., brightness, volume, tones, etc.). As shown, each sensor is coupled to a respective user interface component by associated circuitry 18. It should be understood, however, that a sensor may be coupled to multiple user interface components, or multiple sensors may be coupled to the same user interface component. Further, sensor(s) and user interface component(s) may be coupled with one another directly, or indirectly via their associated circuitry.

As shown in FIGS. 1a and 1b, and more particularly for example in FIG. 2, the circuitry 18 of a device may include a processor 20, and may further include volatile and/or non-volatile memory 22. The processor and/or memory may be embodied in any of a number of different manners including, for example, one or more of any of the following: microprocessors, processors with or without accompanying digital signal processor(s), special-purpose integrated circuits, field-programmable gate arrays (FPGAs), controllers, microcontrollers, application-specific integrated circuits (ASICs) or the like. In various instances, the memory may be configured to store content, data, software including computer-readable or otherwise executable instructions or the like, which may at least partially direct operation of the processor.

The processor 20 may be generally configured to control operation of the user interface components 16 based on signals from the sensors 14. The processor may be configured to provide this control in a number of different manners, such as by pulse-width modulation (PWM) of individual color channels (e.g., in the case of multicolored LEDs). This can be done either through native hardware or an external, dedicated integrated circuit. In another example, a software PWM may be created, also through the processor. Further modification of the PWM may result in various output effects, such as the transition between colors or simply the on-off fading of colors.

The circuitry 18 may also include at least one interface or other means for transmitting and/or receiving data, content or the like (e.g., transmitter, receiver or transceiver). In this regard, the interface(s) can include at least one communication interface 24 or other means for transmitting and/or receiving data, content or the like. The communication interface(s) may be configured to communicate according to a number of different technologies such as to establish a point-to-point network, body area network (BAN) or wireless BAN, personal area network (PAN) or wireless PAN, near-me area network (NAN), local area network (LAN) or wireless LAN (WLAN), or the like. Examples of suitable technologies include Bluetooth, Bluetooth low energy (BLE), near field communication (NFC), Wi-Fi, wireless USB, Zigbee or the like.

The interface(s) may also include a user input interface 26 (where the user input interface may form part of the user interface). The user input interface may, in turn, include any of a number of components allowing the device to receive input from a user (operator), such as a keypad, one or more switches or other input device.

The device may further include a power supply, which may be replaceable and/or rechargeable. In instances in which the power supply may be rechargeable, charging of the devices may be accomplished through a variety of means. In one example, the apparatus may include means to interconnect the devices, such as through a male and female interconnect. The interconnected devices, having a common ground and power source, may then connect to a single power source, such as a USB cable or standard AC charger, in order to charge each of the devices.

In another example of charging the devices, each of the devices may dock to a port (e.g., plastic port), similar in size to a human finger, whose purpose may be to supply power through an interconnecting port on the tip of the "finger" (port), which may mate with a complimentary port on the inside of each device. This example may have additional advertising implications in that the device may be mounted on a piece which resembles a finger, indicating to the viewer exactly how the device may be worn and/or used.

Returning to FIGS. 1*a* and 1*b*, one or more devices may be arranged on a substrate (e.g., glove 12) in any of a number of different manners. In one example embodiment, a substrate may include a single device including one or more sensors 14 and user interface components 16 coupled to common circuitry 18. In another example embodiment, a substrate may include one or more independent devices—each of which includes one or more sensors and user interface components coupled to its own circuitry. As shown in FIGS. 1*a* and 1*b*, for example, a user interface component may be affixed to each finger of a glove (although the glove may include fewer or even a single user interface component). The user interface components may then be coupled to common circuitry to which a single sensor is also coupled as in FIG. 1*a*; or the user interface components may be coupled to separate, respective circuitry to which separate, respective sensors are also coupled as in FIG. 1*b*. In an example embodiment similar to FIG. 1*b* but utilizing a different substrate, separate devices may be affixed to substrates molded in the form of thimbles or other objects configured to fit over a user's finger or fingertip—the user thereby being able to wear a separate device on each finger. Even in the event of sensors and user interface components being coupled to respective circuitry, the circuitry of multiple devices may be interconnected to permit coordination between the devices.

The device may be configured to filter static acceleration due to gravity, and may do so in a number of different manners such as by utilizing a high-pass filter on the sensor output or through software code to look for a minimum threshold change between the current and previous values. During operation, a minimum movement threshold value may be established to give the user easier control of an inherently sensitive device. This minimum threshold may apply to one or all of the axes in the case of a multi-axis accelerometer. This may keep individual color channels off unless a specified amount of acceleration corresponding to that channel is present.

The device may be configured to distinguish movement in the positive or negative of an axis, such as by comparing a current value to a previous value representative of position of a sensor, where the previous value may be stored in memory. A current value greater than the previous value may indicate a positive acceleration, a current value less than the previous value may indicate a negative acceleration, and a value approximately the same as the previous value may indicate that no acceleration along that axis has occurred.

Due to the sensitivity of modern accelerometers, a certain degree of signal conditioning may be desired to smooth the signal. This may be accomplished in a number of different manners, such as by smoothing capacitors placed on the output of the sensor or through software manipulations of the data, such as acquiring a moving average of incoming data points.

Further, the device may be programmed to alter the output in various ways according to various algorithms. For example, the user may limit the number of output colors (e.g., just yellow and green), have the colors cycle through, or any other such manipulation of output combinations. In another example of the device being programmed to alter the output, the device may be programmed to implement an algorithm that dynamically affects the fade (or the output rate at which the output signal decays) (dynamic fade). More particularly for example, in instances in which a sensor 14 registers a decrease in acceleration, the circuitry 18 may be programmed to fade the output directly proportional to the speed at which the device accelerates or decelerates. For example, if the user quickly accelerates the device, the fade time may be short, whereas if the user slowly moves the device, the fade time may be longer. Thus, the device may attempt to create a profile for each stroke, where a change in direction between strokes may correspond to an output of zero, regardless of the length or speed of the stroke. Other example algorithms are provided below in the manner of scenarios in which example embodiments of the present invention may be implemented.

Programming of the device to implement one or more algorithms for altering the output may be accomplished through onboard software, or by connecting (e.g., via USB, wirelessly, etc.) the device to another computing device such as a computer, another similar device or the like, where a program may allow the user to manipulate various output patterns. One example of connecting the device to another computing device 26 such as a computer located remote from the device and wirelessly connected thereto is shown in FIG. 3. In one more particular example, the communication interface 24 of the circuitry 18 may be configured to communicate with another computing device via an appropriate communication interface 28 at the other computing device. In these examples, the other computing device may include a suitable processor 30 and memory 32 storing computer-readable instructions that, in response to execution by the processor, cause the other computing device to perform one or more functions described herein. In this example, the communication interface may provide a means for the device to receive instructions, commands or the like (generally referred to as instructions) from the other computing device that affect the algorithm by which the device is programmed to alter its output. For example, while one or more users equipped with devices are at a venue for a music concert, a computer of the venue may instruct the devices to only produce two specific colors, allowing the devices to generate these colors but limit the device in its output abilities for the time during which the user(s) of the devices are at the concert.

In another example, the device may receive instructions (via the communication interface 24) to change the algorithm by which it alters its output. For example, the device may receive instructions to change its algorithm from one in which positive and negative movements along a particular axis result in one color (e.g., red), to another in which positive movements along a particular axis produce one color (e.g., blue) and negative movements along that same axis produce another color (e.g., red).

In one example, the device and other similar devices (on the same or different substrates) may have associated identifiers (IDs), which may allow selective instruction of the devices. For example, another computing device (e.g., device 26) may be configured to communicate with devices having specific IDs, allowing discriminatory manipulation of the devices to the effect that, for example, less than all of the devices may be affected with an algorithm update while the algorithm implemented by remaining devices, not targeted by the other computing device, remains unchanged.

As indicated above, the other computing device by which the device receives instructions may be another device. In this regard, one or more devices may be configured to assume the role of another computing device and propagate instructions to its own neighbors (e.g., on a common substrate), such as in a manner implementing a short-range ad-hoc network. In one example, all devices may be in receive-mode until a signal is received from a neighbor device instructing them to affect their function. In one example, this routine may end with each receiving device transmitting the signal to its own neighbors, thus spreading the signal from each unit until all desired units have been altered. One example embodiment of this application may be seen in the context of the aforementioned concert, where the venue's computer may target individual devices such as those neighboring the computer, which may then propagate the signal outward to other devices until all devices at the venue are affected.

Another example means for particular devices to be re-programmed by another computing device, may involve using a camera-based system that may recognize the geospatial position of individual, and target specific devices according to their respective geospatial positions (which may be approximately the same or different). In one example, this may be accomplished by implementing a software routine in which each of a plurality of devices may be activated one at a time, and produce a trigger signal as its individual output (e.g., brightly flash a specific color). The other computing device in this example may have a priori knowledge of or otherwise acquire the IDs of the devices, and may address each device one at a time, instructing it to create the trigger signal. A camera may be positioned to capture or otherwise see the trigger signals of the devices, may acquire the geospatial position(s) of the devices. And by correlating the time at which the transmission is sent and the trigger produced, the other computing device may map the position of each device, characterized by its own unique ID. After mapping the devices, the other computing device may target specific devices based on their position(s), such as in order to create desired aesthetic results.

Reference is made to FIG. 4, which illustrates various steps in a method of operation of the apparatus 10 according to example embodiments of the present invention. Generally, as shown in block 34, the method includes receiving a measurement of the orientation, position and/or movement of the substrate 12 from a sensor 14 of a device affixed thereto. The method then includes calculating visual and/or aural output according to an algorithm as a function of the measurement, and controlling a user interface component 16 to produce the calculated output, as shown in blocks 36 and 38.

To further understand various example embodiments of the present invention, consider the following scenarios in which the device is affixed to a glove 12, and the user interface components 16 include LEDs (although the scenarios are equally applicable to other components configured to provide visual and/or aural feedback).

For an LED output, each device may monitor, in real time, the acceleration acting upon the device in three dimensions. In one example, the device may emit a particular color based on the intensity and direction of acceleration. Thus, acceleration solely in a first direction (e.g., along the x-axis) may cause the respective LED(s) to emit a first color (e.g., red). Acceleration in a second direction perpendicular to the first direction (e.g., along the y-axis) may cause the respective LED(s) to emit a second color (e.g., blue). And acceleration in a third direction perpendicular to both the first and second directions (e.g., along the z-axis) may cause the respective LED(s) to emit a third color (e.g., green). In this example, in instances in which the device measures acceleration in multiple ones of the first, second and third directions, the respective LED(s) may emit a mixture or combination of the first, second and third colors—such as in proportion to the acceleration in the respective directions.

In the above example, if the user moves their hand in the first and second directions at the same time, the LED(s) may emit a combination of the first and second colors (e.g., purple), assuming acceleration of approximately the same magnitude in the respective directions. Acceleration with a larger first-direction component may show a greater intensity of the first color (e.g., a redder purple), and so on. In the same manner, the magnitude or intensity of acceleration along a single axis may affect the luminosity of the LED(s). And by keeping the apparatus 10 still, with zero acceleration, the apparatus may turn off and not emit any color.

In another example scenario, the LED(s) may be directed to emit different colors depending on whether the user accelerates in the positive or negative of an axis. In the previous embodiment, any acceleration in the first direction (e.g., x-axis) may cause the LED(s) to emit the first color (e.g., red). In this example, positive acceleration in the respective direction may cause the LED to emit red, while a negative acceleration in the respective direction may cause it to emit yellow, and so on.

Another example utilizes the same data, but adds a variable delay in the output, either via delaying the onset of the emission, the fading of the emission, or both, for visual effect. The purpose of this is for applications where the user makes rapid and brief movements, and can be achieved through variable microsecond delays in software, or by hardware, in a resistor-capacitor network circuit.

In yet another example in which the user input interface may include a microphone or other sound recorder, the microphone may be utilized to record sounds such as music. The sensor data may then be constructively added to the recorded and possibly signal-processed sound waves to allow the LED(s) to increase their luminosity, or flash, with the rhythm of the music. Likewise, the LED(s) may exhibit similar behavior by means of the received signal/instruction from another computing device, as mentioned earlier, equipped with a microphone or other sound recorder for recording sounds such as music.

The apparatus 10 of example embodiments of the present invention may have a number of different applications. In a first application, the apparatus may be used for creative expression, aesthetic appeal, and general entertainment. The device may be used by performers in such places as interpretive dances and art shows, or by the general public in discotheques, concerts, or clubs.

In another application, example embodiments may be used by those that deal with communication in places that are low-light. These include air traffic control and general road traffic control.

In yet another application, the apparatus may be worn by the deaf or hard of hearing, as a means to communicate with those unfamiliar with sign language. As the user conveys a message via sign language, a camera may be used to analyze the emitted colors, and may thereby be able to know the precise acceleration of every finger. This data may be used to access a lookup table, and thus directly translate the movements to sound or text. By limiting the circuitry worn on the user, not only may the device be discrete and easy to wear, but the load on the micro-controller may light, allowing for faster calculations and response-time, not to mention a longer battery life. Software can be written for cell phones and computers, which utilize ubiquity of video capturing hardware and webcams, which translates the color data into speech.

In a further application, the device may be used as a rehabilitative device for persons with Ataxia, a medical condition in which the individual's intended movements do not match their actual movements. Since the output of the device correlates directly to movement, the patient may have visual and aural feedback to see the movements they are making.

According to one example aspect of the present invention, functions performed by one or more of the devices may be performed by various means, such as hardware and/or firmware, including those described above, alone and/or under control of a computer program or computer software. The computer program may be part of a computer program product for performing one or more functions of example embodiments of the present invention. This computer program product may include a computer-readable storage medium, such as the non-volatile storage medium, and software including computer-readable program code portions, such as a series of computer instructions, embodied in the computer-readable storage medium.

In this regard, FIG. 3 is a flowchart of apparatuses, methods and program products according to example embodiments of the present invention. It will be understood that each block or step of the flowchart, and combinations of blocks in the flowchart, can be implemented by various means, such as hardware, firmware, and/or software including one or more computer program instructions. As will be appreciated, any such computer program instructions may be loaded onto a computer or other programmable apparatus to produce a machine, such that the instructions which execute on the computer or other programmable apparatus (i.e., hardware) create means for implementing the functions specified in the block(s) or step(s) of the flowchart. These computer program instructions may also be stored in a computer-readable memory that can direct a computer or other programmable apparatus to function in a particular manner, such that the instructions stored in the computer-readable memory produce an article of manufacture including instruction means which implement the function specified in the block(s) or step(s) of the flowchart. The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the block(s) or step(s) of the flowchart.

Accordingly, blocks or steps of the flowchart support combinations of means for performing the specified functions, combinations of steps for performing the specified functions and program instruction means for performing the specified functions. It will also be understood that one or more blocks or steps of the flowchart, and combinations of blocks or steps in the flowchart, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising:
   a substrate;
   an accelerometer affixed to the substrate, the accelerometer being configured to measure acceleration of the substrate, and produce a signal representative of the measured acceleration;
   a light-emitting component capable of emitting multiple colors of light with variable luminosity, the color and luminosity of light emitted by the light-emitting component defining a visual output produced by the light-emitting component; and
   a processor coupled to the accelerometer and light-emitting component, the processor being configured to receive the signal from the accelerometer, calculate a visual output according to an algorithm as a function of the measured acceleration of the substrate, and cause the light-emitting component to produce the calculated visual output,
   wherein according to the algorithm, the luminosity of the light emitted by the light-emitting component is proportional to a magnitude of the measured acceleration of the substrate.

2. The apparatus of claim 1, wherein the substrate is in a user-wearable form.

3. The apparatus of claim 1, wherein the substrate is in the form of a handheld wand.

4. The apparatus of claim 1, wherein according to the algorithm, the luminosity of light emitted by the light-emitting component decays at a rate directly proportional to a rate at which the magnitude of the acceleration measured by the accelerometer changes.

5. The apparatus of claim 1, wherein the measured acceleration of the substrate includes the magnitude and a direction, and wherein according to the algorithm, the color of the light emitted by the light-emitting component is calculated based on the direction of the measured acceleration.

6. The apparatus of claim 5, wherein according to the algorithm, the light-emitting component emits a first color in an instance in which the measured acceleration is in a first direction, and emits a second, different color in an instance in which the measured acceleration is in a second, different direction.

7. The apparatus of claim 1, wherein the accelerometer is a multi-axis accelerometer configured to measure component accelerations for respective axes, the component accelerations having respective magnitudes and directions along the respective axes, the signal produced by the accelerometer being representative of the component accelerations, and wherein according to the algorithm, the light-emitting component emits a different color for each component acceleration, the color for each component acceleration being emitted with a luminosity proportional to the magnitude of the respective component acceleration.

8. The apparatus of claim 1, wherein the processor is further configured to receive selection of the algorithm from a plurality of different algorithms.

9. The apparatus of claim 1 further comprising:
a wireless communication interface configured to receive one or more instructions that affect the algorithm according to which the processor is configured to calculate the visual output, the processor being configured to follow the one or more instructions as the visual output is calculated according to the algorithm.

10. The apparatus of claim 1, wherein the accelerometer, light-emitting component and processor form a device affixed to the substrate, the apparatus comprising a plurality of devices each of which includes a respective accelerometer, light-emitting component and processor.

11. The apparatus of claim 10, wherein one of the devices is configured to transmit and others of the devices are configured to receive, one or more instructions that affect the algorithm according to which the processors of the devices are configured to calculate respective visual outputs, the processors being configured to follow the one or more instructions as the respective visual outputs are calculated according to the algorithm.

12. An apparatus comprising:
a substrate;
an accelerometer affixed to the substrate, the accelerometer being configured to measure acceleration of the substrate, and produce a signal representative of the measured acceleration;
a light-emitting component capable of emitting multiple colors of light with variable luminosity, the color and luminosity of light emitted by the light-emitting component defining a visual output produced by the light-emitting component;
a processor coupled to the accelerometer and light-emitting component, the processor being configured to receive the signal from the accelerometer, calculate a visual output according to an algorithm as a function of the measured acceleration of the substrate, and cause the light-emitting component to produce the calculated visual output; and
a wireless communication interface configured to receive one or more instructions that affect the algorithm according to which the processor is configured to calculate the visual output, the processor being configured to follow the one or more instructions as the visual output is calculated according to the algorithm.

13. The apparatus of claim 12, wherein according to the algorithm, the luminosity of light emitted by the light-emitting component decays at a rate directly proportional to a rate at which a magnitude of the acceleration measured by the accelerometer changes.

14. The apparatus of claim 12, wherein the measured acceleration of the substrate includes a magnitude and direction, and wherein according to the algorithm, the color of the light emitted by the light-emitting component is calculated based on the direction of the measured acceleration.

15. The apparatus of claim 12, wherein the accelerometer is a multi-axis accelerometer configured to measure component accelerations for respective axes, the component accelerations having respective magnitudes and directions along the respective axes, the signal produced by the accelerometer being representative of the component accelerations, and wherein according to the algorithm, the light-emitting component emits a different color for each component acceleration, the color for each component acceleration being emitted with a luminosity proportional to the magnitude of the respective component acceleration.

16. The apparatus of claim 12, wherein the processor is further configured to receive selection of the algorithm from a plurality of different algorithms.

17. The apparatus of claim 12, wherein the accelerometer, light-emitting component and processor form a device affixed to the substrate, the apparatus comprising a plurality of devices each of which includes a respective accelerometer, light-emitting component and processor.

18. The apparatus of claim 17, wherein one of the devices is configured to transmit and others of the devices are configured to receive, one or more instructions that affect the algorithm according to which the processors of the devices are configured to calculate respective visual outputs, the processors being configured to follow the one or more instructions as the respective visual outputs are calculated according to the algorithm.

19. An apparatus comprising:
a wireless communication interface; and
a processor and memory storing computer-readable instructions that, in response to execution by the processor, cause the apparatus to at least:
receive an indication of one or more instructions; and
cause transmission of the one or more instructions to a plurality of handheld or user-wearable apparatuses via the wireless communication interface, each of the handheld or user-wearable apparatuses including:
an accelerometer affixed to a substrate, the accelerometer being configured to measure acceleration of the substrate, and produce a signal representative of the measured acceleration;
a light-emitting component capable of emitting multiple colors of light with variable luminosity, the color and luminosity of light emitted by the light-emitting component defining a visual output produced by the light-emitting component; and
a processor coupled to the accelerometer and light-emitting component, the processor being configured to receive the signal from the accelerometer, calculate a visual output according to an algorithm as a function of the measured acceleration of the substrate, and cause the light-emitting component to produce the calculated visual output,
wherein the one or more instructions that affect the algorithm according to which the processors of the handheld or user-wearable apparatuses are configured to calculate the visual output, the respective processors being configured to follow the one or more instructions as the visual output is calculated according to the algorithm.

20. The apparatus of claim 19, wherein the handheld or user-wearable apparatuses have respective identifiers, and wherein the processor of the apparatus is configured to address the instructions to selective ones but not all of the handheld or user-wearable apparatuses according to the respective identifiers.

21. The apparatus of claim 19, wherein according to the algorithm, the luminosity of light emitted by the light-emitting component decays at a rate directly proportional to a rate at which the magnitude of the acceleration measured by the accelerometer changes.

22. The apparatus of claim 19, wherein the measured acceleration of the substrate includes the magnitude and a direction, and wherein according to the algorithm, the color of the light emitted by the light-emitting component is calculated based on the direction of the measured acceleration.

23. The apparatus of claim 19, wherein the one or more instructions include selection of the algorithm according to which the processors of the handheld or user-wearable apparatuses are configured to calculate the visual output, the algorithm being selectable from a plurality of different algorithms.

* * * * *